A. F. DICKEY.
RESILIENT TRANSMISSION GEARING.
APPLICATION FILED NOV. 11, 1913.
1,139,502.
Patented May 18, 1915.
2 SHEETS—SHEET 2.
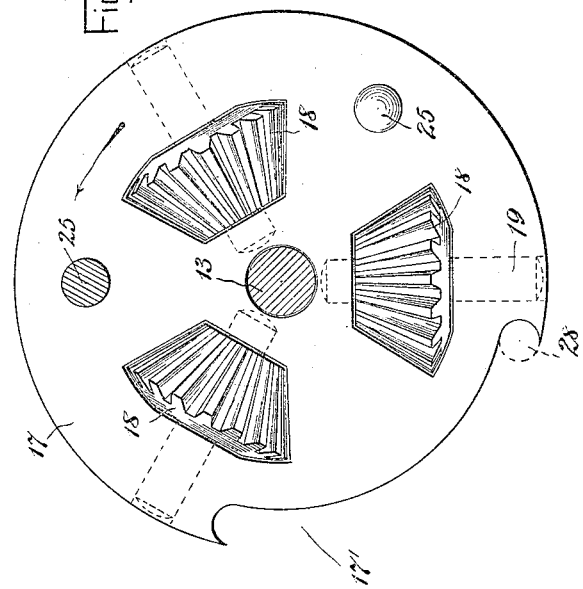
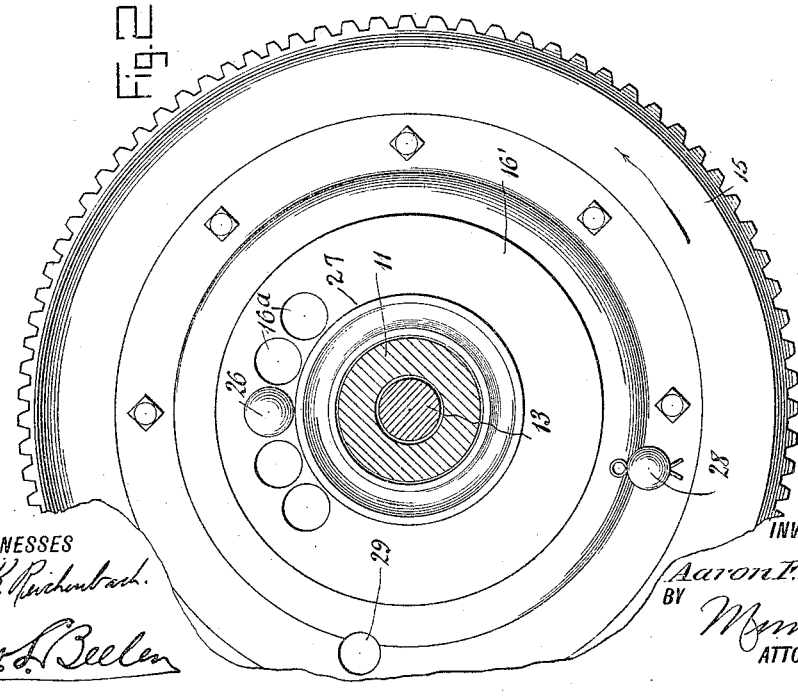

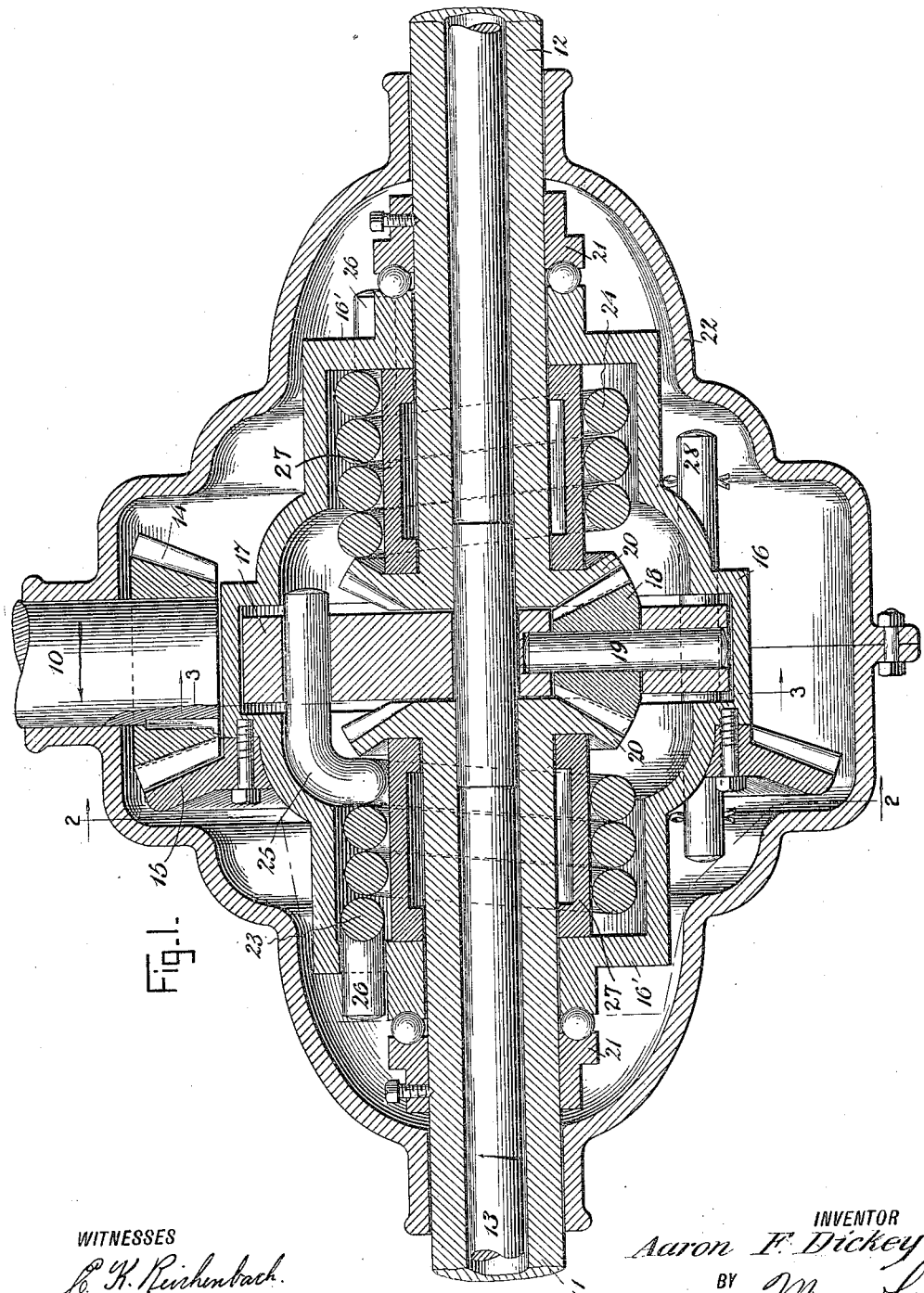

UNITED STATES PATENT OFFICE.

AARON F. DICKEY, OF SOMERSET, PENNSYLVANIA.

RESILIENT TRANSMISSION-GEARING.

1,139,502.  Specification of Letters Patent.  Patented May 18, 1915.

Application filed November 11, 1913. Serial No. 800,280.

*To all whom it may concern:*

Be it known that I, AARON F. DICKEY, a citizen of the United States, and a resident of Somerset, in the county of Somerset and State of Pennsylvania, have invented a new and Improved Resilient Transmission-Gearing, of which the following is a full, clear, and exact description.

This invention relates to transmission gearing and has particular reference to means for cushioning the driving action upon such gearing so as to relieve the mechanism from unnecessary shocks, jars or offensive clattering of the parts.

More specifically, the invention contemplates, in the embodiment illustrated, a differential driving gear for automobiles or other machinery, the same including a resilient connection between the power shaft and the differential drum whereby, when the engine is started, the first impulse thereof will be received by the cushion which will act to store more or less of the force of such impulse and transmit it easily and gradually to the driven elements thus avoiding the thumping or jerking action commonly observed in this class of machinery while being started.

A further object of the invention is to provide a constant cushioning effect between the power shaft and the driven axle whereby when the vehicle or machine is operated over rough or uneven roads much of the irregularity of action of the motor will be borne by the cushion instead of it being transmitted through the machine and felt by the occupants of the vehicle.

The foregoing and other objects of the invention will hereinafter be more fully described and claimed and illustrated in the drawings forming a part of this specification in which like characters of reference indicate corresponding parts in all the views, and in which—

Figure 1 is a longitudinal section through a preferred embodiment of the invention, the plane being horizontal and coinciding with the axes of the driving and driven shafts, the parts shown in this figure being substantially as they would appear when the vehicle is operated under the maximum resistance; Fig. 2 is a view on the broken line 2—2 of Fig. 1, the casing being omitted; and Fig. 3 is a corresponding view on the line 3—3 of Fig. 1.

The several parts of the device may be made of any suitable materials, and the relative sizes and proportions, as well as the general design of the mechanism, may be varied to a considerable extent without departing from the spirit of the invention hereinafter more fully set forth and specifically claimed.

Referring to the drawings for a more particular description of the mechanism I show at 10 a power or driving shaft and at 11 and 12 the two parts of a driven shaft or rear axle of an automobile, these two parts being in axial alinement and usually at right angles to the axis of the driving shaft. The axle parts are maintained or steadied in position by means of a center shaft 13.

The driving shaft is fitted with a pinion 14 meshing with and driving positively the gear 15 clamped or otherwise connected to the shell 16 of the differential drum within which is a hub 17 mounted upon and movable around the axis of said center shaft 13. Said differential drum hub is provided with a plurality of pinions 18 journaled therein on radially arranged pivots 19 and having constant meshing engagement with corresponding gears 20 carried by the inner ends of the axle parts 11 and 12.

The differential drum shell 16 is journaled at its ends upon the axle parts 11 and 12 and is prevented from endwise movement thereon by thrust bearings 21 secured to the axle parts adjacent the ends of the gear casing 22.

The gear 15 instead of having direct positive driving connection with the hub 17 of the differential gear as in usual practice, is connected thereto by means of a resilient member or members shown herein as comprising a pair of coil springs 23 and 24 having their inner ends 25 extending into or through the hub 17 parallel to the axis of the driven shaft and having their outer ends 26 extending outwardly through the ends 16' of the transmission differential drum shell 16. Each of these ends is preferably provided with a series of holes 16$^a$ through any one of which the adjacent end 26 extends, and by providing a series of holes variation in tension of the cushioning device may be provided according to the strength of the spring or the work to be accomplished. The intermediate portion of each spring is coiled around a sleeve 27 whereby the action of the spring is guarded from the driven shaft and a large bearing for the spring is provided. Said sleeves 27 furthermore coöperate between the gears 20 and ends 16' of the shell to assist in positioning the several parts of the mechanism.

By reference to Fig. 3 especially it will be observed that the differential drum hub 17 is provided with a cut out portion or notch 17' extending along its rim between two of the pivots 19, such notch determining the maximum possible degree of independent rotation of the shell and said hub around the same axis. A bar 28 arranged parallel to the axis of the driven shaft extends through the shell 16 and lies transversely of the hub 17 within the notch 17' thereof.

With the parts constructed as shown and assumed to be operated in the direction indicated by the arrows, power from the power shaft 10 is transmitted directly and positively through the pinion 14 and gear 15 to the shell 16. Assuming that the vehicle or machine is stationary when the motor is started, the first effect of the application of power to the shell 16 will cause the bar 28 to be advanced toward the position shown in dotted lines in Fig. 3. Then, if the resistance is sufficient, due to a heavy load or the strong impulse of the motor, said bar will be carried to the end of said notch where it will engage the shoulder formed in the hub at the end of the notch. The next effect of the motor, therefore, will be to cause the positive driving of the hub 17 by engagement therewith of the bar 28. It will be understood that the parts will be so designed that the bar 28 will engage said shoulder, however, only at unusual times and that the normal driving effect of the driving shaft will be transmitted to the driven shaft while the bar 28 floats anywhere between the two ends of the notch 17'. The springs 23 and 24, therefore, serve to receive practically all of the bumps or irregularities encountered by the machine. At 29 I show a hole arranged through the differential drum shell 16 parallel to the hole through which the bar 28 extends, said hole 29 being practically at the same distance from the hole receiving the bar 28 as is represented by the length of the notch 17'. In the event of the breakage of a spring, or, if for any other reason it is desired to make a positive connection between the shell and the hub for driving in either direction, another pin or bar (not shown) may be inserted through the hole 29 so that it will occupy the end of the notch opposite the bar 28.

Having thus described my invention, I claim as new and desire to secure by Letters Patent:—

1. A differential transmission gear mechanism, comprising a casing, two oppositely disposed axles, a driving shaft, a centering shaft within said axles, a hub revoluble on said centering shaft, a plurality of pinions carried by said hub, a gear on each axle enmeshed with said pinions, a shell revoluble on said axles, a gear thereon, a pinion on said driving shaft enmeshed with said shell gear, and a coil spring connected with said hub on each side thereof, said shell being provided with a plurality of openings for adjustably receiving corresponding ends of said springs.

2. A differential transmission gear mechanism, comprising a casing, two oppositely disposed axles, a driving shaft, a centering shaft for said axles, a hub revoluble on said centering shaft, a plurality of pinions carried by said hub, a gear on each axle enmeshed with said pinions, a shell revoluble on said axles, a gear thereon, a pinion on said driving shaft enmeshed with shell gear, resilient means connecting said hub and shell, and a pin held in said shell adapted to limit movement of said hub, said hub being segmentally recessed to permit the positioning of said pin.

3. A differential transmission gear mechanism, comprising a casing, two oppositely disposed axles, a driving shaft, a centering shaft, a hub revoluble on said centering shaft, a plurality of pinions carried by said hub, a gear on each axle enmeshed with said pinions, a shell revoluble on said axles, a gear secured to said shell, a pinion on said driving shaft enmeshed with said shell gear, resilient means interposed between said hub and shell, and means for limiting the movement of said hub with respect to said shell, said shell being provided with openings to receive said last named means.

In testimony whereof I have signed my name to this specification in the presence of two subscribing witnesses.

AARON F. DICKEY.

Witnesses:
G. C. WINSLOW,
P. G. COBER.

Copies of this patent may be obtained for five cents each, by addressing the "Commissioner of Patents Washington, D. C."